(12) United States Patent
Nair et al.

(10) Patent No.: US 10,891,083 B2
(45) Date of Patent: Jan. 12, 2021

(54) SYSTEM AND METHOD FOR RANDOMIZING DATA

(71) Applicant: Microsemi Solutions (US), Inc., Aliso Viejo, CA (US)

(72) Inventors: Unnikrishnan Sivaraman Nair, Bangalore (IN); Rino Micheloni, Turate (SM); Alessia Marelli, Dalmine (IT)

(73) Assignee: MICROSEMI SOLUTIONS (US), INC., Chandler, AZ (US)

( * ) Notice: Subject to any disclaimer, the term of this patent is extended or adjusted under 35 U.S.C. 154(b) by 112 days.

(21) Appl. No.: 15/921,407

(22) Filed: Mar. 14, 2018

(65) Prior Publication Data
US 2018/0300088 A1    Oct. 18, 2018

(30) Foreign Application Priority Data
Apr. 18, 2017  (IN) .............................. 201721013797

(51) Int. Cl.
  *G06F 3/06*  (2006.01)
  *G06F 7/58*  (2006.01)
  *G06F 12/14*  (2006.01)

(52) U.S. Cl.
  CPC .......... *G06F 3/0661* (2013.01); *G06F 3/0608* (2013.01); *G06F 3/0616* (2013.01); *G06F 3/0619* (2013.01); *G06F 3/0644* (2013.01); *G06F 3/0658* (2013.01); *G06F 3/0673* (2013.01); *G06F 7/588* (2013.01); *G06F 12/14* (2013.01)

(58) Field of Classification Search
  CPC .................................. G06F 3/06; G06F 12/14
  See application file for complete search history.

(56) References Cited

U.S. PATENT DOCUMENTS

| | | | |
|---|---|---|---|
| 6,704,871 B1 * | 3/2004 | Kaplan | G06F 21/72 713/192 |
| 7,930,623 B2 | 4/2011 | Pisek et al. | |
| 8,665,648 B2 | 3/2014 | Mun et al. | |
| 9,268,531 B1 | 2/2016 | Son et al. | |
| 9,292,428 B2 | 3/2016 | Kanamori et al. | |
| 9,444,655 B2 | 9/2016 | Sverdlov et al. | |
| 2003/0204541 A1 * | 10/2003 | Shackleford | G06F 7/582 708/250 |
| 2007/0076873 A1 * | 4/2007 | Yamamoto | G11B 20/00086 380/241 |

(Continued)

*Primary Examiner* — Charles Rones
*Assistant Examiner* — Tian-Pong Chang
(74) *Attorney, Agent, or Firm* — Glass and Associates; Kenneth Glass

(57) ABSTRACT

A method and associated system for randomizing data to be stored in a memory storage device including, receiving a plurality of data bytes to be randomized at a memory controller and written to a page of a memory storage device, wherein the page comprises a plurality of data sectors and wherein each of the plurality of data sectors are configured to store a plurality of data bytes, randomizing a first portion of the plurality of data bytes using a first randomizer initialized by a first seed to generate a first portion of randomized data bytes and randomizing a second portion of the plurality of data bytes using a second randomizer initialized by a second seed to generate a second portion of randomized data bytes, wherein the first seed is uncorrelated with the second seed.

34 Claims, 7 Drawing Sheets

(56) References Cited

U.S. PATENT DOCUMENTS

| | | | |
|---|---|---|---|
| 2011/0255453 A1* | 10/2011 | Roh | H04B 1/7176 |
| | | | 370/310 |
| 2012/0166714 A1* | 6/2012 | Mun | G11C 16/3418 |
| | | | 711/103 |
| 2012/0287719 A1* | 11/2012 | Mun | G11C 16/0483 |
| | | | 365/185.18 |
| 2014/0310534 A1* | 10/2014 | Gurgi | G06F 12/1408 |
| | | | 713/193 |
| 2015/0033037 A1* | 1/2015 | Lidman | G06F 12/1408 |
| | | | 713/193 |
| 2016/0072527 A1 | 3/2016 | Tadokoro et al. | |
| 2016/0247581 A1 | 8/2016 | Yoshida et al. | |
| 2016/0266791 A1* | 9/2016 | Lin | G06F 3/0688 |

* cited by examiner

700

```
┌─────────────────────────────────────────────────────────────┐
│ RECEIVING, AT A MEMORY CONTROLLER A PLURALITY OF DATA BYTES TO │
│ BE RANDOMIZED AND WRITTEN TO A PAGE OF A MEMORY STORAGE     │
│ DEVICE COUPLED TO THE MEMORY CONTROLLER, WHEREIN THE PAGE   │
│ COMPRISES A PLURALITY OF DATA SECTORS AND WHEREIN EACH OF THE │
│ PLURALITY OF DATA SECTORS ARE CONFIGURED TO STORE A PLURALITY │
│ OF DATA BYTES                                               │
│ 705                                                         │
└─────────────────────────────────────────────────────────────┘
                              ↓
┌─────────────────────────────────────────────────────────────┐
│ RANDOMIZING A FIRST PORTION OF THE PLURALITY OF DATA BYTES  │
│ USING A FIRST RANDOMIZER INITIALIZED BY A FIRST SEED TO GENERATE │
│ A FIRST PORTION OF RANDOMIZED DATA BYTES TO BE STORED IN A FIRST │
│ DATA SECTOR OF THE PLURALITY OF DATA SECTORS                │
│ 710                                                         │
└─────────────────────────────────────────────────────────────┘
                              ↓
┌─────────────────────────────────────────────────────────────┐
│ RANDOMIZING A SECOND PORTION OF THE PLURALITY OF DATA BYTES │
│ USING A SECOND RANDOMIZER INITIALIZED BY A SECOND SEED TO   │
│ GENERATE A SECOND PORTION OF RANDOMIZED DATA BYTES, TO BE   │
│ STORED IN A SECOND DATA SECTOR OF THE PLURALITY OF DATA SECTORS │
│ WHEREIN THE FIRST SEED IS UNCORRELATED WITH THE SECOND SEED │
│ 715                                                         │
└─────────────────────────────────────────────────────────────┘
```

FIG. 7

SYSTEM AND METHOD FOR RANDOMIZING DATA

BACKGROUND OF THE INVENTION

Programmed memory cells in nonvolatile memory storage devices are known to be subject to many system and environmental influences which may be sufficient to alter the state of the data stored in the memory cells. For example, in flash memory devices, the data stored in one or more memory cells may be affected by program voltage disturbances, coupling effects, write/erase cycles, etc. One or more of these influences may result in an undesirable state change in a programmed memory cell, resulting in an increased raw bit error rate of the device.

It is known that randomized data stored in a memory cell array is less likely to be adversely affected by system and environmental influences, when compared to non-randomized data. Accordingly, memory device controllers, such as redundant arrays of independent disks (RAID) controllers and flash-based solid state drive (SSD) controllers, employ data randomization to reduce errors in the data storage systems they control. Randomization circuitry, which may also be referred to as scrambling circuitry, is typically employed in the memory controller to provide randomization of the data prior to storage in the memory device. The randomizer is initialized by a seed value and generates a sequence of random numbers that are then used to randomize the data. However, in order to provide sufficient randomization of the data, typical implementations for randomization require storing a large number of unique seeds in a seed table, which requires an unreasonable amount of dedicated memory.

As such, it is desirable to reduce the number of seeds that need to be stored in memory, thereby reducing the required dedicate memory. Accordingly, what is needed in the art is an improved system and method for randomizing data that reduces the memory requirement for storing randomization seeds while still providing a sufficiently randomized sequence for data randomization.

SUMMARY OF THE INVENTION

In various embodiments, the present invention provides an improved system and method for the randomization of data to be stored in a memory storage device.

In one embodiment, the present invention provides a method for randomizing data to be stored in a memory storage device, which includes, receiving, at a memory controller, a plurality of data bytes to be randomized and written to a page of a memory storage device coupled to the memory controller, wherein the page comprises a plurality of data sectors and wherein each of the plurality of data sectors are configured to store a plurality of data bytes. The method further includes, randomizing a first portion of the plurality of data bytes using a first randomizer initialized by a first seed to generate a first portion of randomized data bytes to be stored in a data sector of the plurality of data sectors and randomizing a second portion of the plurality of data bytes using a second randomizer initialized by a second seed to generate a second portion of randomized data bytes to be stored in the data sector of the plurality of data sectors, wherein the first seed is uncorrelated with the second seed.

In one embodiment, the first randomizer includes a first linear feedback shift register, initialized by the first seed, to generate a first randomization sequence and the second randomizer includes a second linear feedback shift register, initialized by the second seed, to generate a second randomization sequence.

In a particular embodiment, the first seed is generated from an initial seed value, a level one alteration value and a first level two alteration value and the second seed is generated from the initial seed value, the level one alteration value and a second level two alteration value.

In another embodiment, the present invention provides a system for randomizing data to be stored in a page of a memory storage device. The system includes, a memory controller implemented at least partially in hardware. The memory controller includes, interface logic for receiving a plurality of data bytes to be randomized and written to a page of a memory storage device coupled to the memory controller, wherein the page comprises a plurality of data sectors and wherein each of the plurality of data sectors are configured to store a plurality of data bytes, a first randomizer for randomizing a first portion of the plurality of data bytes to be stored in a data sector of the plurality of data sectors, wherein the first randomizer is initialized by a first seed to generate a first portion of randomized data bytes and a second randomizer for randomizing a second portion of the plurality of data bytes to be stored in the data sector of the plurality of data sectors, wherein the second randomizer is initialized by a second seed to generate a second portion of randomized data bytes, and wherein the first seed is uncorrelated with the second seed.

In an additional embodiment, the present invention provides a non-transitory computer-readable media having computer-executable instructions for performing a method of randomizing data to be stored in a memory storage device. In various embodiment, the computing device operates under an operating system and the method issues instructions from the software program for receiving, at a memory controller, a plurality of data bytes to be randomized and written to a page of a memory storage device coupled to the memory controller, wherein the page comprises a plurality of data sectors and wherein each of the plurality of data sectors are configured to store a plurality of data bytes. The computing system additionally operates under the operating system for randomizing a first portion of the plurality of data bytes using a first randomizer initialized by a first seed to generate a first portion of randomized data bytes to be stored in a data sector of the plurality of data sectors and for randomizing a second portion of the plurality of data bytes using a second randomizer initialized by a second seed to generate a second portion of randomized data bytes to be stored in the data sector of the plurality of data sectors, wherein the first seed is uncorrelated with the second seed.

Accordingly, in various embodiments, the present invention provides an improved system and method for randomizing data that reduces the memory requirement for storing randomization seeds while still providing a sufficiently randomized sequence for data randomization.

DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 7 is a flow diagram of a method for generating randomized data for storage in a memory storage device

DETAILED DESCRIPTION OF THE INVENTION

Figure 1:
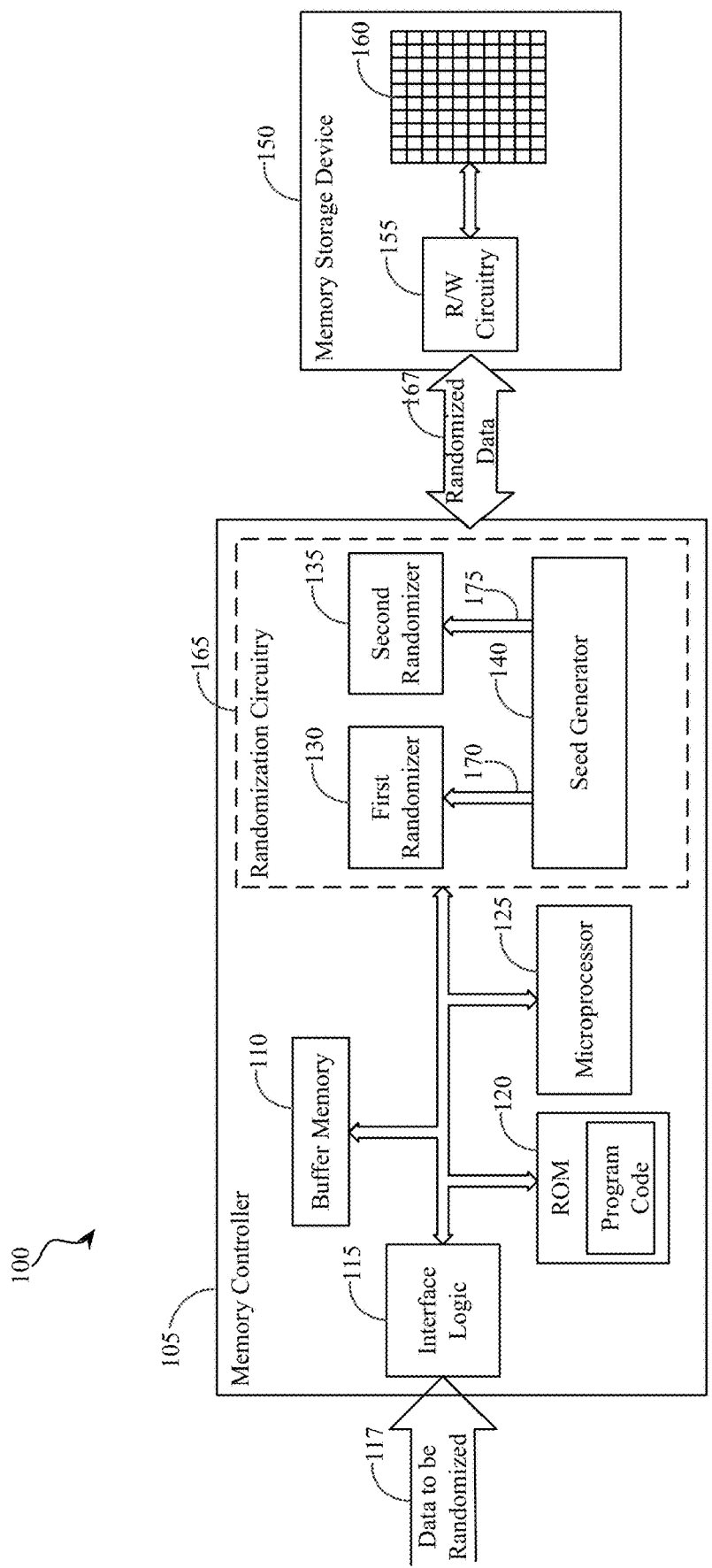
FIG. 1 is a block diagram illustrating a memory controller for randomizing data and a memory storage device, in accordance with an embodiment of the present invention.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, regions, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various embodiments, the present invention provides a system and method for randomizing data for storage in a memory storage device, such as a flash memory storage device.

Data randomization, also referred to as data scrambling, in memory storage devices is defined as an operation that is effective in randomly distributing and storing data patterns to decrease the successive occurrence of the same data in the memory storage device. Data randomization is effective in removing the probability of worst-case data pattern errors that may occur in memory storage devices, thus improving the bit error rate (BER) of the device. Data randomization improves data reliability by providing improved immunity to the raw bit error (BER) over the lifetime of the memory storage device. In general, data randomization involves bit-wise XOR between a randomization sequence and data to be written to the device to generate randomized data prior to writing the data to the device, although other methods of combining the randomization sequence with the data to be written may be utilized without exceeding the scope.

FIG. 1 is a block diagram illustrating a memory system 100, in accordance with an embodiment of the present invention. The memory system 100 can be implemented in various host systems and devices, including, but not limited to, computing devices, digital cameras, mobile phones or other communication devices, removable memory modules, flash memory systems and flash-based redundant arrays of independent disks (RAID), and/or any other system or device in which data is stored and retrieved.

With reference to FIG. 1, a memory system 100 for randomizing and storing data may include a memory controller 105 for randomizing data and a memory storage device 150 for storing the randomized data. The memory controller 105 is configured to randomize data, to store data in the memory storage device 150 and to retrieve data from the memory storage device 150. The memory controller 105 may communicate with a host to receive data for storage in the memory storage device 150 and to retrieve data from the memory storage device 150 for communication to the host. In various embodiments, the memory controller 105 may include both hardware and software components that are known in the art and are interconnected to perform the operations of the memory controller 105. These components may include, interface logic 115, buffer memory 110, read-only memory (ROM) 120 storing program code and a microprocessor 125. The memory controller may further include randomization circuitry 165 comprising a seed generator 140, a first randomizer 130 and a second randomizer 135, each coupled to the seed generator 140.

In various embodiments, the memory storage device 150 may include read/write circuitry 155 and a memory cell array 160. The read/write circuitry 155 converts digital data for storage in the memory cell array 160 to analog storage values and writes them into the memory cells of the memory cell array 160. Data is typically written to and read from the memory cells of the memory cell array 160 in groups of cells, commonly referred to as pages. As such, in some memory configurations, a page of data is the smallest addressable unit of data that can be written to, and read from, the memory cell array 160.

Additionally, a host can write a smaller amount of data called a sector so that a page is composed of n sectors. A data sector is a logical partition of a page that is define by the memory controller 105. The memory cell array 160 is not aware of the data sector size or the number of such data sectors within a page. In addition, the memory cell array 160 defines the read and write commands based on a page. Accordingly, once the memory controller 105 collects all the n sectors, the physical write of the page to the memory cell array 160 is initiated. As such, while the memory cell array 160 supports a minimum page write, the memory controller 105 supports a host that provides data in chunks that are smaller than a complete page.

In one embodiment, the memory controller 105 may continuously send the n sectors to the memory cell array 160, and one or more memory modules at the memory cell array 160 may store the received sectors until the n sectors have been received. Once all of the n sectors have been transmitted to, and store at, the memory cell array 160, the memory controller 105 may send a write command to the memory cell array 160 to initiate the physical writing of the n sectors to the memory cell array 160. In another embodiment, the memory controller 105 may include one or more memory modules responsible for collecting and storing the n sectors. In this embodiment, after the n sectors have been stored at the memory controller 105, the n sectors are sent to the memory cell array 160 in a burst and a write command is also sent from the memory controller 105 to the memory cell array 160 to initiate the physical writing of then sectors to the memory cell array 160. In both embodiments, a physical write to the memory cell array 160 is only initiated after all n sectors are collected as a page.

In the present invention, a data sector is a logical division of data within a complete page of data. Additionally, the size of the data sector that the memory controller 105 operates on is independent of the page size of a specific memory storage device. Typically, a complete page of data of a memory storage device maybe 8K or 16K bytes. In a particular embodiment of the present invention, a data sector of a complete page of data is determined to be 1024 bytes and the number of data sectors in a page of data is thus determined based upon the configuration of the specific memory device. In an exemplary embodiment, a 16K memory page may be divided into 16 data sectors, each data sector covering 1024 memory storage bytes. The memory cell array 160 may include various type of memory cells known in the art for storing as electrical voltage or charge, such as NAND-based flash memory cells. While shown in the figure as a two-dimensional array, the memory cell array 160 of the present invention may also be in the form of a three-dimensional array, such a 3D NAND flash memory, where the memory cells are stacked vertically in multiple layers.

In operation, the interface logic 115 of the memory controller 105 receives data to be randomized 117 from a host. The received data is then randomized by the randomization circuitry 165 before being sent to the memory storage device 150 as randomized data 167 to be stored in the memory cell array 160. More specifically, a first portion of the plurality of data bytes is randomized by the first randomizer 130 that is initialized by a first seed 170 generated by the seed generator 140 and a second portion of the plurality of data bytes is randomized by the second randomizer 135 that is initialized by a second seed 175 generated by the seed generator 140, wherein the first seed is uncorrelated with the second seed. The data randomized by the first randomizer 130 may then be written to a first sector of the memory cell array 160 and the data randomized by the second randomizer 135 may then be written to a second sector of the memory cell array 160.

In some embodiments, the memory controller 105 may further comprise an error correction code (ECC) unit (not shown), which is responsible for encoding the data prior to storage in the memory storage device 150. The ECC unit may employ one of many suitable encoding techniques, including, but not limited to, low density parity check (LDPC), Reed-Solomon (RC) and Bose-Chaudhuri-Hocquenghem (BCH). In a particular embodiment, the ECC unit calculates an ECC code for the data bytes, and concatenated thereto, to generate encoded data prior to randomizing the data. The encoded data is then randomized to generate the randomized data 167 prior to storing the randomized data 167 in the sector of the memory cell array 160.

Various elements of the memory controller 105, including the randomization circuitry 165, may be implemented at least partially in hardware. The microprocessor 125 of the memory controller 105 may be configured to run appropriate software for controlling the various hardware elements responsible for randomizing data prior to storage in the memory storage device 150. In one embodiment the appropriate software is stored on the ROM 120.

In an exemplary configuration of the memory cell array 160, the memory cells making up the array may be arranged in multiple rows and columns with each memory cell comprising at least one storage element, such as a floating-gate transistor. In this exemplary configuration, the gates of the transistors in each row of the array are coupled by word lines and the sources of the transistors in each column of the array are coupled by bit lines. Additionally, in the case of the 3D array, the memory cell array 160 may include multiple stacked layers comprising the rows and columns of cells. An exemplary memory cell array 160 is typically divided into multiple pages, wherein each page identifies a group of memory cells that are programmed and read simultaneously. A page is commonly defined as memory cells linked with the same word line and is the smallest addressable unit for read and write operations in the memory cell array 160. Additionally, each page may be composed of a memory storage main area and a spare area, wherein the spare area can be used to store error correction codes (ECC), as is well known in the art. In addition, pages are often sub-divided into two or more data sectors to accommodate user data size. A data sector is commonly defined as the smallest addressable unit for write operations by a user. For example, a 16K memory page may be divided into 16 sectors, each sector covering 1024 memory storage bytes, in addition to any required spare bytes for ECC.

Figure 2:
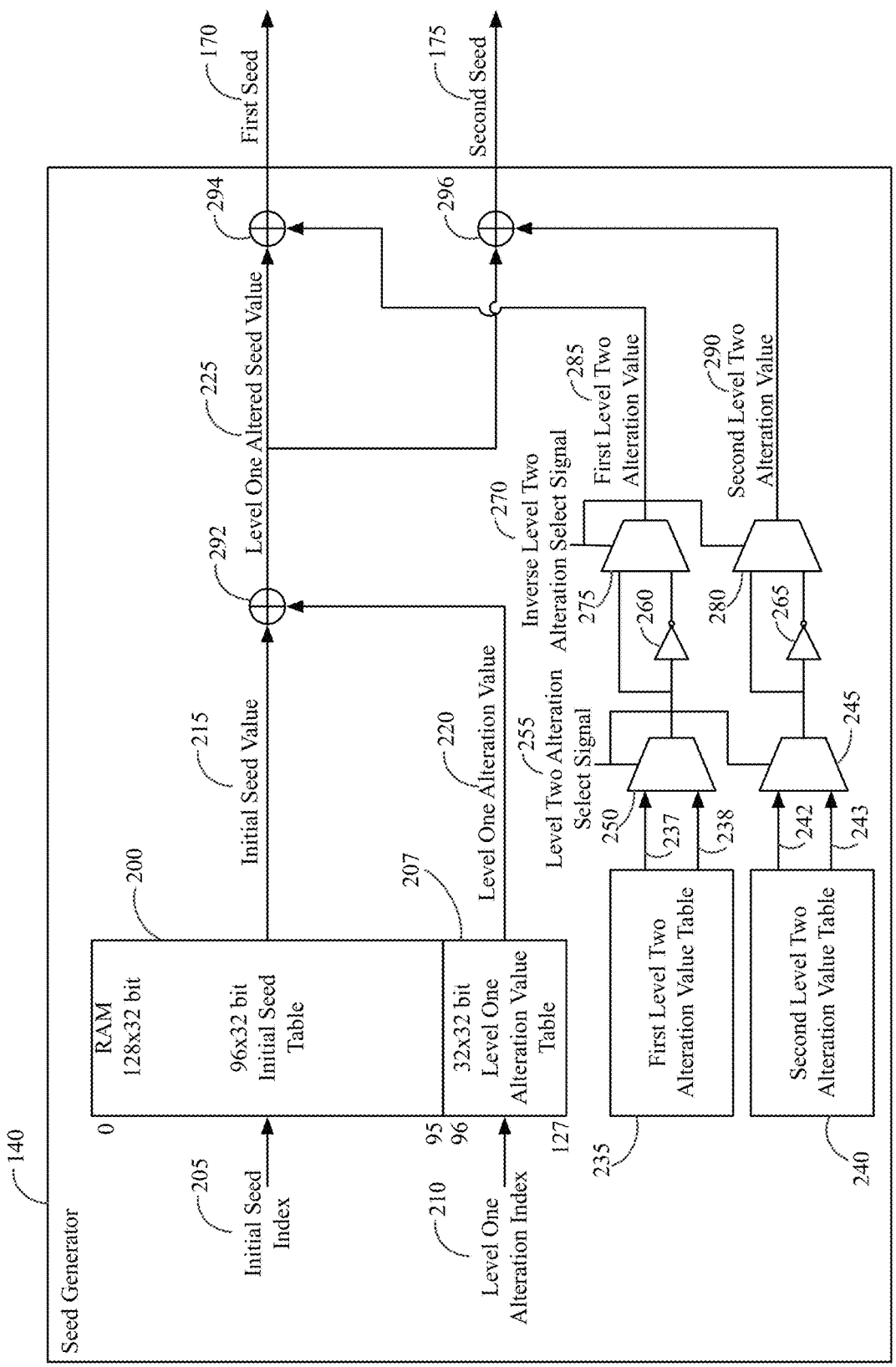
FIG. 2 is a block diagram illustrating a seed generator, in accordance with an embodiment of the present invention.

With reference to FIG. 2, in accordance with various embodiments of the present invention, the seed generator 140 is responsible for generating a first seed 170 to initialize the first randomizer 130 and a second seed 175, that is uncorrelated with the first seed 170, to initialize the second randomizer 135. The resulting randomized sequence generated by the first randomizer 130 and the second randomizer 135 are then used to randomize the data bytes prior to being stored in the memory storage device 150. In order to guarantee that the first seed 170 is uncorrelated with the second seed 175, the seeds must be without correlation between each page. In addition, the seeds must be without any correlation with adjacent sectors and without correlation along the 3D plane (in the case of a 3D memory array) and the seeds must change at every program/erase cycle. By enforcing the randomization of the seeds, the programmed data in the memory storage device will be randomized along word lines, bit lines and in the plane direction.

The function of the seed generator 140 of the present invention is to generate two uncorrelated seeds 170, 175 that may be used to initiate two independent randomizers 130, 135. The two independent randomizers 130, 135 may be used to generate two independent random sequences of numbers and by performing an exclusive-OR operation between each of the two independent random sequences of numbers and the input data 117, randomized data 167 may be output from the memory controller 105 to be stored in the memory storage device 150. To generate the two uncorrelated seeds 170, 175, as shown in FIG. 2, the seed generator 140 may include an initial seed table 200, a level one alteration value table 207, a first level two alteration value table 235, a second level two alteration value table 240 and associated circuitry for generating a first seed 170 and a second seed 175, that is uncorrelated with the first seed 170. In one embodiment, the initial seed table 200 and the level one alteration value table 207 may be stored in a 128×32 bit RAM, wherein the initial seed table 200 may be stored in a first 96×32 bit portion of the RAM and the level one alteration value table 207 may be stored in a second 32×32 bit portion of the RAM. This is not intended to be limiting, and in other embodiments, the initial seed table 200 and the level one alteration value table 207 may be stored in separate RAM devices or be of other sized. In the exemplary embodiment illustrated in FIG. 2, the initial seed table 200 may store up to 96 initial seed values, each of 32 bits. An initial seed index 205 is used to select the initial seed value 215 from the initial seed table 200. The level one alteration value table 207, in the exemplary embodiment illustrated in FIG. 2, may store up to 32 level one alteration values, each of 32 bits. A level one alteration index 210 is used to select the level one alteration value 220 from the level one alteration value table 207. The seed generator 140 further includes first exclusive-OR logic 292 to perform an exclusive-OR operation between the initial seed value 215 selected by the initial seed index 205 and the level one alteration value 220 selected by the level one alteration index 210 to generate a level one altered seed value 225.

In addition to the level one altered seed value 225 provided by the initial seed table 200 and the level one alteration value table 207 of the seed generator 140, and output by the first exclusive-OR logic 292, the seed generator 140 additionally generates a first level two alteration value 285 and a second level two alteration value 290 to be used in the final generation of the first seed 170 and the second seed 175. The first level two alteration value table 235 and the second level two alteration value table 240 of the seed generator 140 are preferably stored in configurable registers. The first level two alteration value table 235 is assigned to the first randomizer 130 and the second level two alteration value table 240 is assigned to the second randomizer 135. The first level two alteration value table 235 and the second level two alteration value table 240 contain different entries and each of the tables 235, 240 includes two entries for each randomizer 130, 135. A level two alteration select signal 255 is used to select one of the two values 237, 238 from the first level two alteration value table 235 and to select one of the two values 242, 243 from the second level two alteration value table 240. However, since the tables 235, 240 store different values, the values indexed from the tables 235, 240 by the level two alteration select signal 255 will be different. In the illustrated embodiment, there are two possible 32-bit values from the first level two alteration value table 235 and the second level two alteration value table 240 that can be selected by the level two alteration select signal 255, however this is not intended to be limiting and additional values may be added to the level two alteration value tables 235, 240. The seed generator 140 further includes a first multiplexer 250 coupled to the output of the first level two alteration value table 235 and a second multiplexer 245 coupled to an output of the second level two alteration value table 240. The first multiplexer 250 is controlled by the level two alteration select signal 255 to select one of the two values 237, 238 from the first level two alteration value table 235 and the second multiplexer 245 is also controlled by the level two alteration select signal 255 to select one of the two values 242, 243 from the second level two alteration value table 240. In addition, the seed generator 140 further includes a first inverter 260 in combination with a third multiplexer 275 and a second inverter 265 in combination with a fourth multiplexer 280. An output of the first multiplexer 250 is coupled to an input of first inverter 260 and to a first input of the third multiplexer 275, and an output of the first inverter 260 is coupled to a second input of third multiplexer 275. An output of the second multiplexer 245 is coupled to an input of the second inverter 265 and to a first input of the fourth multiplexer 280, and an output of the second inverter 265 is coupled to a second input of the fourth multiplexer 280. The third multiplexer 275 and the fourth multiplexer 280 are controlled by an inverse level two alteration select signal 270. The first multiplexer 250, third multiplexer 275 and first inverter 260, in combination with the select signals 255, 270 are effective in selecting a first level two alteration value 285 from the two values 237, 238 from the first level two alteration value table 235 and their inverted values. The second multiplexer 245, fourth multiplexer 280 and second inverter 265, in combination with the select signals 255, 270 are effective in selecting a second level two alteration value 290 from the two values 242, 243 from the first level two alteration value table 240 and their inverted values. Thus, each of first level two alteration value 285 and second level two alteration value 290 may be one of 4 different values. The seed generator 140 further includes a second exclusive-OR logic 294 to perform an exclusive-OR operation between the level one altered seed value 225 and the first level two alteration value 285 to generate the first seed value 170 and a third exclusive-OR logic 296 to perform an exclusive-OR operation between the level one altered seed value 225 and the second level two alteration value 290 to generate the second seed value 175.

In operation, the seed generator 140 accesses the initial seed table 200 using the initial seed index 205 to provide an initial seed value 215 and the seed generator 140 accesses the level one alteration value 207 table using the level one alteration index 210 to provide a first level one alteration value 220. Seed index is generated by a function of page index, WE count and number of sectors. An exclusive-OR operation is then performed on the initial seed value 215 and the first level one alteration value 220 by first exclusive-OR logic 292 to generate a level one altered seed value 225. In addition, the seed generator 140 accesses the first level two alteration value table 235 and the second level two alteration value table 240 using the level two alteration select signal 255 to provide a first level two alteration value 285 and a second level two alteration value 290. The select signal 255 is configurable by firmware in the memory controller 105. An exclusive-OR operation is then performed between the level one altered seed value 225 and the first level two alteration value 285 by exclusive-OR logic 294 to generate the first seed 170 and an exclusive-OR operation is performed between the level one altered seed value 225 and the second level two alteration value 290 by exclusive-OR logic 296 to generate the second seed 175. The first seed 170 is then used to initialize the first randomizer 130 and the second seed 175 is used to initialize the second randomizer 135.

In general, the first randomizer 130 and the second randomizer 135 are used to alter a received pattern of data values into a randomized pattern of data values, such that the probability of any one data value occurring in the randomized data pattern is equal to the probability of any other data value occurring in the randomized data pattern. Establishing a randomized data pattern to be stored in the memory storage device 150 improves data reliability by providing improved immunity to the raw bit error rate (BER) over the lifetime of the memory storage device 150. In various embodiments, the seed generator 140 is used to generate a first seed 170 to initialize one or more linear feedback shift registers (LFSR) within the first randomizer 130 and a second, uncorrelated, seed 175 to initialize one or more linear feedback shift registers (LFSR) within the second randomizer 135. In order for the first randomizer 130 and the second randomizer 135 to operate as required to generate a sufficiently long cycle of uncorrelated random data patterns, the initial seed used to initialize each of the randomizers 130, 135 must also be sufficiently random. In accordance with various embodiments of the present invention, sufficient randomization of the seeds used to initialize the LFSRs of the first randomizer 130 and the second randomizer 135 is provided by first altering an initial seed value with a level one alteration value and then altering the resulting level one altered seed value with a first level two alteration value to generate the first seed 170 to initialize the LFSR of first randomizer 130 and altering the resulting level one altered seed value with a second level two alteration value to generate the second seed 175 to initialize the LFSR of the second randomizer 135. As previously described, the initial seed value, the level one alteration value, the first level two alteration value and the second level two alteration value are dependent upon values stored in tables or configuration registers and the values are selected based upon an appropriate index to the table. As such, an initial seed index 205 is used to select the initial seed value 215 from the initial seed index table 200, a level one alteration index 210 is used to select the level one alteration value 220 from the level one alteration value table 207 and the level two alteration select signal 255 and the inverse level two alteration select signal 270 are used to select the first level two alteration value 285 and the second level two alteration value 290.

Figure 3:
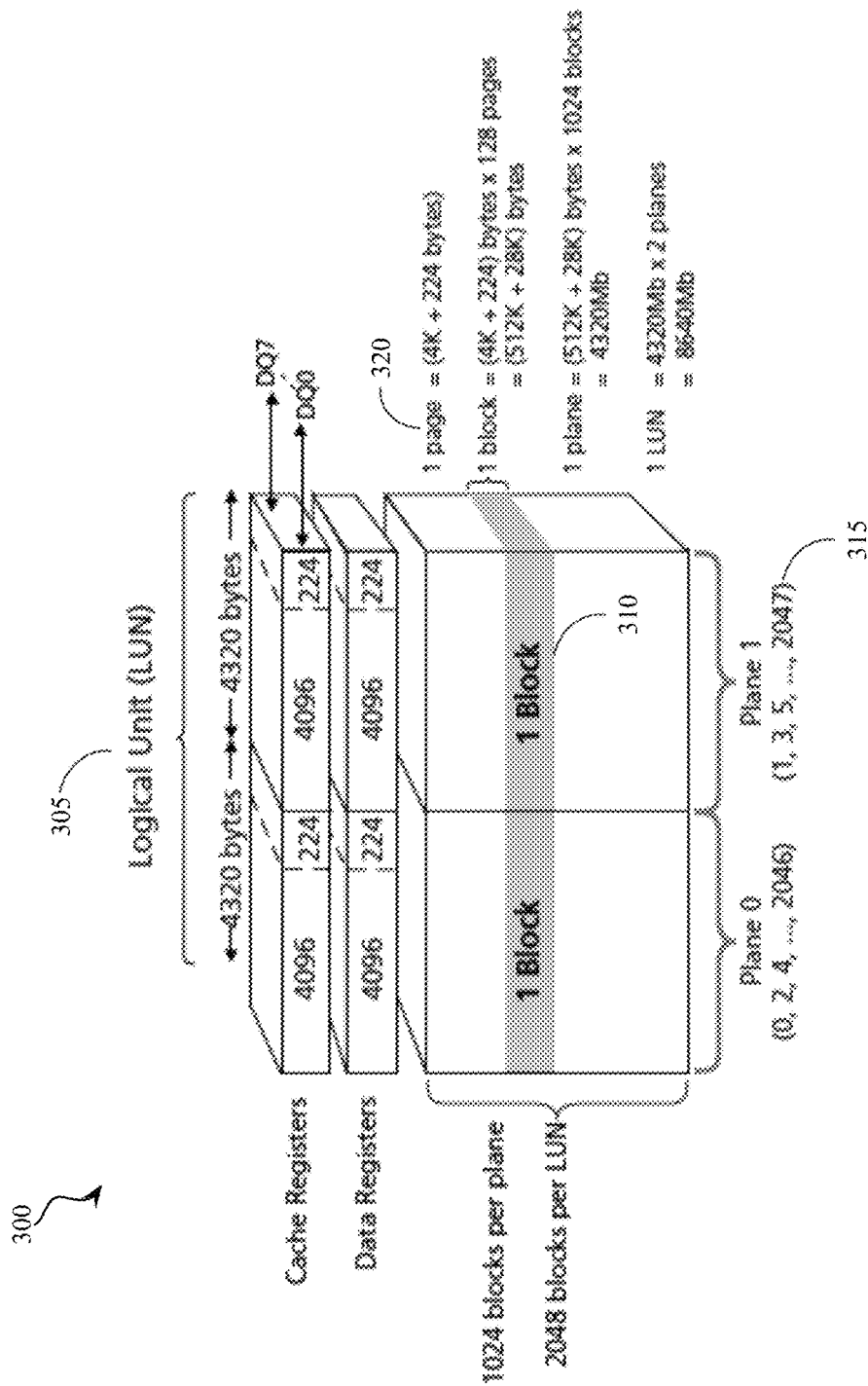
FIG. 3 is a diagram illustrating a common memory array configuration, in accordance with an embodiment of the present invention.

FIG. 3 illustrates a common memory array organization. In a flash memory array, a target is a unit of memory accessed by a chip enable signal. A target contains one or more flash die and a flash die is the minimum unit that can independently execute commands and report status. Each of these flash die is referred to as a logical unit (LUN) which are operationally independent of other LUNs in the same or multiple targets. As shown in FIG. 3, a LUN 305 of a flash memory array consists of multiple blocks 310 and each block may comprise multiple planes 315. Each block also consists of multiple pages 320. A row address is commonly used to uniquely identify a particular page of a target, wherein the row address includes the LUN number, plane number, block number and page number. In the memory array, the row address indicates a page of data, which is the smallest readable and writable unit of data in the memory array. However, in some applications, when it is necessary to write a portion of data into the memory array that is smaller than a complete page of data, data sectors may be used. As such, a data sector is commonly defined as the smallest addressable unit for write operations to a memory array. By utilizing data sectors, a number of data sectors can be collected by the memory controller and once the controller has collected a number of data sectors equivalent to a page of data, the memory controller may then initiate a physical write to the memory array.

Each of the indexes used to access the appropriate table for the generation of the initialization seed for the randomizers are calculated by the microprocessor 125 based upon a predetermined formula. In general, the initial seed index 205 is calculated based upon a formula which includes the page number, the sector number, an offset address and a WE count of the block associated with the particular sector of the memory array 160 of the memory storage device 150 in which the data is to be written. In the present invention, the offset address is determined by a few selected bits from the row address which include the LUN number, plane number, block number and page number. In addition, the WE count is a software configurable value stored in a WE count configuration register which indicates how many write/erase cycles are completed for the block of memory. As such, each of the first randomizer 130 and the second randomizer 135 reads the WE count from a respective WE count configuration register and firmware located in the microprocessor 125 is responsible for updating the WE count configuration register once for each WE cycle performed by the block.

The level one alteration index 210 is calculated based upon a first formula which includes a logical unit number (LUN), a block number, the page number, an address of the particular sector of the memory array 160 in which the data is to be written and a WE count of the block of the memory array 160. The level one alteration index 210 is generated by adding a few selected bits of the row address to the most significant 5 bits of the WE count. As previously described, the row address uniquely identifies a page in the memory array 160 and includes the LUN number, page number and block number. The specific address bits selected from the row address are based upon software configuration by the firmware in the controller. The level two alteration select signal 255 is calculated by microprocessor 125 based upon a second formula which includes the logical unit number, the block number, the page number and a few selected bits of the row address of the particular sector of the memory array 160 in which the data is to be written.

In particular, in accordance with an embodiment of the present invention, the initial seed index 205 used to select the initial seed value 215 from the initial seed table 200 is determined by the LSB 7 bits of the field determined by the page number and sector number, the offset address and the write/erase count in the form, Initial Seed Index[6:0]:

<={PAGE_SECT_TRUC [6:0]+OADD[5:0]+WE_COUNT[5:0]}mod N_MOD[6:0]

As such, in this embodiment, the initial seed index 205 is a function of at least a truncated 7 bits of a physical address of the data sector of the page of data to be randomized (PAGE_SECT_TRUNC[6:0]), 5 bits of a configurable offset address (OADD[5:0]), the 6 LSB of a write/erase cycle count of the memory storage device (WE_COUNT[5:0]) and a firmware configurable modulus operation (N_MOD[6:0]). N_MOD[6:0] is a firmware configurable value which determines the allowable maximum index value. Assuming an initial table size having a maximum of 96 entries, the allowed maximum index value less than 96.

In this embodiment, PAGE_SECT_TRUNC[6:0] ensures that the seeds of adjacent sectors are not the same, wherein PAGE_SECT_TRUNC[6:0]:

=PAGE_NUM*NUM_SECTORS_PER_PAGE+SECTOR_NUM and as such, the 7 truncated bits of the physical address of the data sector used in the formula for the initial seed index 205 are based upon a product of the page number and the number of sectors per page in the memory array, plus the sector number of the data sector in the memory array.

The offset address, OADD[5:0], is derived by selecting 6 bits of the physical address of the page, including the logic unit number (LUN), the block number and the page number. The location of the bits selected for the offset address is firmware programmable and can be varied across blocks and logic units. The use of the offset address in the formula for the initial seed index 205 reduces the probability of repetition of the same seed being generated based on the same sector number across pages and ensures that repetition, if any, will not be on neighboring page.

In an exemplary embodiment, assuming a configuration wherein the offset address (OADD[5:0]) comprises the least significant 6 bits of the page number, the page includes 16 data sectors, the write/erase count is equal to zero and the N_MOD value is set to 64, for this configuration, for the 16 data sectors of each page, an initial seed index will be:
page 0: 0, 1, 2 . . . , 15
page 1: 17, 18, . . . , 32
page 2: 34, 35, . . . , 49
page 3: 51, 52, . . . , 63, 0, 1, 2
page 4: 4, 5, . . . , 19

As such, in the above illustrated exemplary embodiment, if the offset address (OADD) is not used in the determination of the seed index, the seed index generated for data sector number 0, 1, . . . would have been the same for page number 0 and for page number 4.

The WE_COUNT[5:0] field is the 6 least significant bits of WE_COUNT[10:0], which indicates the number of program/erase (P/E) cycles experienced by the block. The number of least significant bits of the WE_COUNT[10:0] used is firmware configurable and the number of bits selected ensures that each page receives different initialization seeds with each P/E cycle.

The N_MOD[6:0] field is a firmware configurable number between 64 and 95 which serves to limit the number of entries in the initial seed table 200. Changing the value in this field has a significant effect on the value of the seeds provided by the seed generator 140.

In accordance with an embodiment of the present invention, the level one alteration index 210 used to select the level one alteration value 220 from the level one alteration value table 207 is determined by the page number, the second offset value and the write/erase count in the form, Level One Alteration Index[6:0]:

<={"11", [(row_address,[ALT_SEED_OFST+4:ALT_SEED_OFST]+WE_COUNT[10:6] mod 32]} wherein "+4" indicates that instead of the actual row address, which consists of the page number, block number and LUN number, the 5 bits starting from ALT_SEED_OFST are selected. As such, based on the firmware configurable value of ALT_SEED_OFST, the bits ALT_SEED_OFST+4, ALT_SEED_OFST+3, ALT_SEED_OFST+2, ALT_SEED_OFST+1 and ALT_SEED_OFST are selected.

As such, in this embodiment, the level one alteration index 210 is a function of row_address, which includes the logic unit number (LUN), the block number and the page number of the data sector, the 5 most significant bits (MSB) of firmware configurable WE_COUNT[10:0], which indicates the number of program/erase (P/E) cycles of the block and an offset value (ALT_SEED_OFST) which is configurable by firmware. The formula for the level one alteration index 210 ensures that the generated seeds are different across groups of pages, even if the initial seed table 200 repeats at regular intervals. For example, an ALT_SEED_OFST value of six means that the offset address used to generate the level one alteration index will be the [10:6] MSB bits of the row address of the data sector. The LSB bits of the row address are the page number associated with the data sector, as such using the 6 LSB bits will result in a level one alteration index that changes every 64 pages, thereby generating logical groups of 64 pages (64*Number of sectors per page) wherein the level one altered seed value 225 will then be different after each 64 pages because the level one alteration index 210 will be equal to 0+96 for pages 0 to 63 and will be equal to 1+96 for pages 64 to 127. As such, even if the initial seed index 205 repeats for the same sector numbers across the logical groups of pages created by the level one alteration value 220, the resulting seeds generated by the seed generator 140 will be different as the level one alteration index varies across the logical groups of pages.

In this embodiment, the level two alteration select signal 255 is used to derive the first level two alteration value 285 from the first level two alteration value table 235 and the second level two alteration value 290 from the second level two alteration value table 290 is determined at least by selected bits of the physical address of the data sector as determined by, the logical unit number, the block number and the page number. As previously described, the level two alteration select signal 255 is generated by the microprocessor 125 and is used to select one of two values 237, 238 from a configuration register storing a first level two alteration value table 235 and to select one of two values 242, 243 from a configuration register storing a second level two alteration value table 240. The inverse level two alteration select signal 270 generated by the microprocessor 125 is then used to select between each of the two values and the two inverted values, effectively four different seeds. The level two alteration select signal 255 is effective in differentiating the seeds that are provided to the two randomizers, while using the same initial seed table 200 and the same level one alteration value table 207. As such, the level two alteration select signal 230 and the inverse level two alteration select signal 270, and associated logic, generates a first level two alteration value 285 and a second level two alteration value 290 that are effective in ensuring that the first seed 170 provided to the first randomizer 130 and the second seed 175 provided to the second randomizer 135 are different and uncorrelated. By appropriately configuring the level two alteration select signal 255 and the inverse level two alteration select signal 270, a unique number of seeds equal to four times the number of pages are generated. In an exemplary configuration of the level two alteration select signal 255, if the ALT_SEED_OFST=6 and therefore the level one alteration index 210 changes with each 64 pages, as previously described, and assuming that the level one alternation index 210 provides a random sequence of seed values that do not repeat for adjacent data sectors and do not repeat for the same data sector number across neighboring page numbers, then performing an exclusive-OR operation on the level one alteration index 210 increases the size of the random sequence of seed values by 32 (64*32). Assuming two bits [12,11] of the ALT_SEED_OFST for the level two alteration select signal 255, increases the size of the non-repeating sequence of seed values four times (64*32*4 pages).

In the present invention, the use of the two-level alteration scheme for the generation of the seeds for the randomizers is effective in modifying the initial seed index 205 across a logical group of pages. The first level of alteration of the initial seed 215 is provided by the level one alteration value selected from the level one alteration value table 207. The firmware configurable offset field used in the formula for the level one alteration index 210 enables firmware in the microprocessor 125 to select a number of pages in each logical group of pages. The memory controller 105 of the present invention is not tied to any specific physical memory array organization and firmware configurations may be provide to optimize the operation of the seed generator 140 for a variety of flash vendors employing many different physical memory array sizes. The memory controller 105 of the present invention may be easily implemented in hardware using logical gates. In a particular embodiment, the operation of the seed generator 140 is optimized by using only 7 bits of the page and sector numbers, 5 bits of the offset address and the LSB 6 bits of the write/erase count of the memory device, and by restricting the modulus to between 64 and 95. These restrictions serve to simplify the hardware required to implement the logic gates, thereby reducing the levels of combinational logic required. As the levels of combinational logic are reduced, the maximum clock frequency at which static timing can be achieved increases. Splitting the write/erase count field between the initial seed index 205 and the level one alteration index 210 additionally simplifies the hardware logic while also providing a high number of write/erase cycles. The use of the level two alteration select signal 230 is a cost-effective way of increasing the total number of seeds available to initiate the randomizers.

Figure 4:
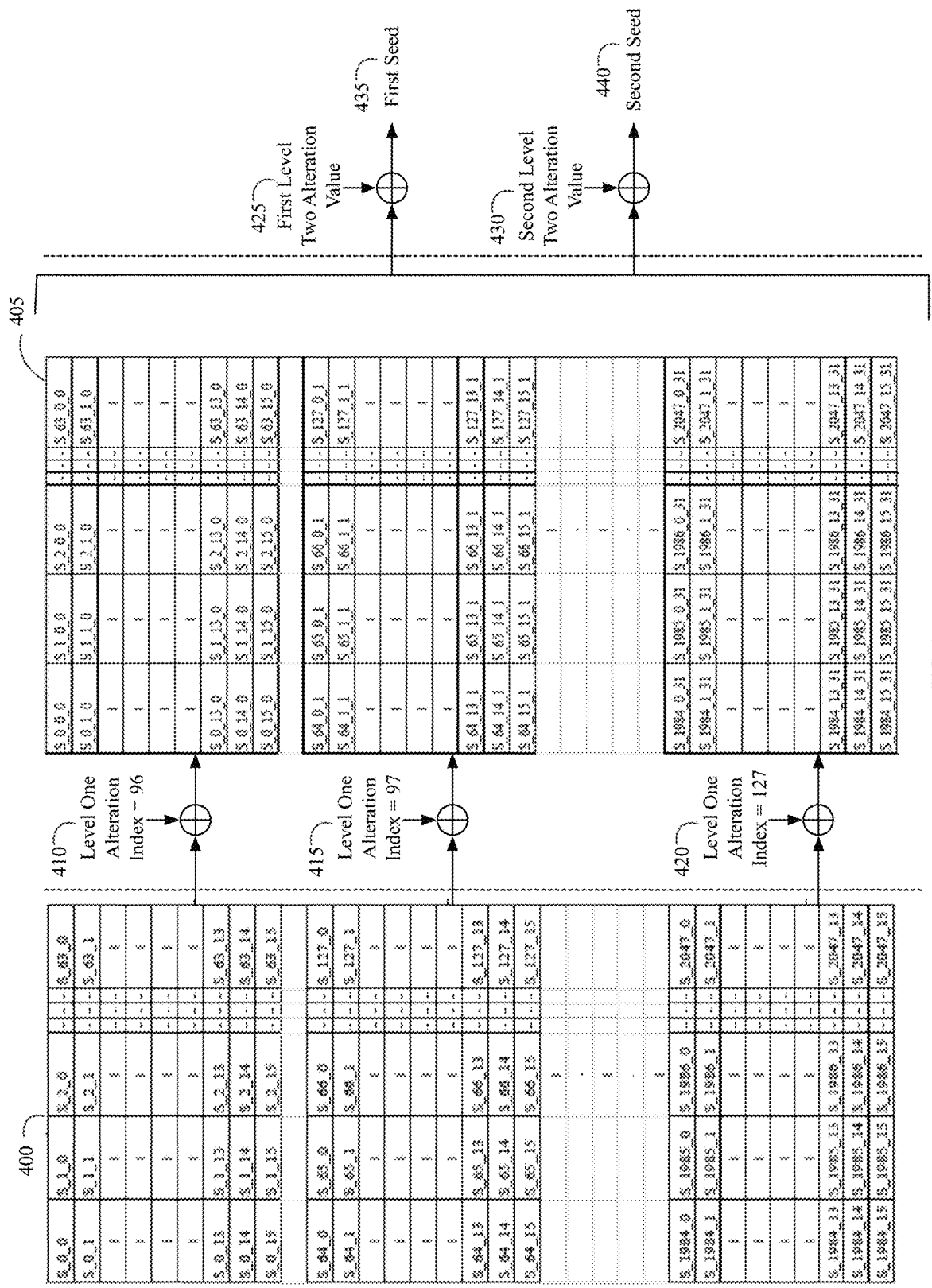
FIG. 4 is a diagram illustrating a logical representation of the seed generation, in accordance with an embodiment of the present invention.

FIG. 4 illustrates an exemplary embodiment of the present invention illustrating in more detail a logical representation of the seed generation in accordance with the present invention for multiple groups of pages. The tables illustrated in FIG. 4 are logical representations of the physical tables shown in FIG. 2. As shown in FIG. 4, and as previously described, an initial seed value is selected from an initial seed table 400 based upon an initial seed index 205. As shown, the entry in each cell of the initial seed table 400 indicates the seed that will be used in order to randomize data in a page number and sector number in the seed_{page_num}_{sector_num} format. An exclusive-OR operation is then performed using the initial seed value from the initial seed table 400 and a level one alteration value that is determined based upon a level one alteration index 410, 415, 420 and the level one alteration value table 405. Each of the level one alteration indexes 410, 415, 420 are different for each logical group of 64 pages. For example, the level one alteration index may be 0+96 for pages 0 to 63 and may be 1+96 for pages 64 to 127. As shown, the entry in each cell in the level one alteration value table 405 indicates the seed corresponding to the respective page number and sector number in the seed_{page_num}_{sector_num}_{alt_seed_index} format. The logical level one alteration value table 405 represents the seed value after the level one alteration seed operation, for various pages. An exclusive-OR operation is then performed between a resulting level one altered seed value and a first level two alteration value 425 to generate a first seed 435 and an exclusive-OR operation is performed between the resulting level one altered seed value and a second level two alteration value 430 to generate a second seed 440. The first seed 435 is then used to initialize the first randomizer 130 and the second seed 440 is used to initialize the second randomizer 135.

While the illustrated embodiment is shown implementing two randomizers, it is within the scope of the present invention to utilize more than two randomizers and the seed generator 140 is easily scalable for any number of randomizers. Since the seeds for each of the randomizers are differentiated only by the second level of alteration additional randomizers can be accommodated by adding more second level alteration value tables and associated logic for providing the second level alteration values.

As previously described, in an exemplary embodiment for performing the randomization of a page of data, wherein the page of data comprises a plurality of data sectors and wherein each of the plurality of data sectors comprises a plurality of data bytes, the memory controller may include two independent randomizers, each initialized by a different seed which are uncorrelated with one another. In an embodiment of the present invention employing two randomizers, the two randomizers may be operated in parallel, each processing a different portion of the bytes of the data sector. As such, the memory controller is operated to randomize a first portion of the plurality of data bytes of a data sector of the plurality of data sectors using a first randomizer initialized by a first seed to generate a first portion of randomized data bytes and to randomize a second portion of the plurality of data bytes of the data sector of the plurality of data sectors using a second randomizer initialized by a second seed to generate a second portion of randomized data bytes, wherein the first seed is uncorrelated with the second seed. Dividing the data bytes of the data sector into a first portion and a second portion allows for the use of two independent randomizers, operating in parallel, to increase the processing speed of the device. The use of two independent randomizers in the design of the memory controller is not intended to be limiting and more than two independent randomizers may be incorporated into the design of the memory controller for randomizing individual portions of data bytes of a data sector.

Figure 5:
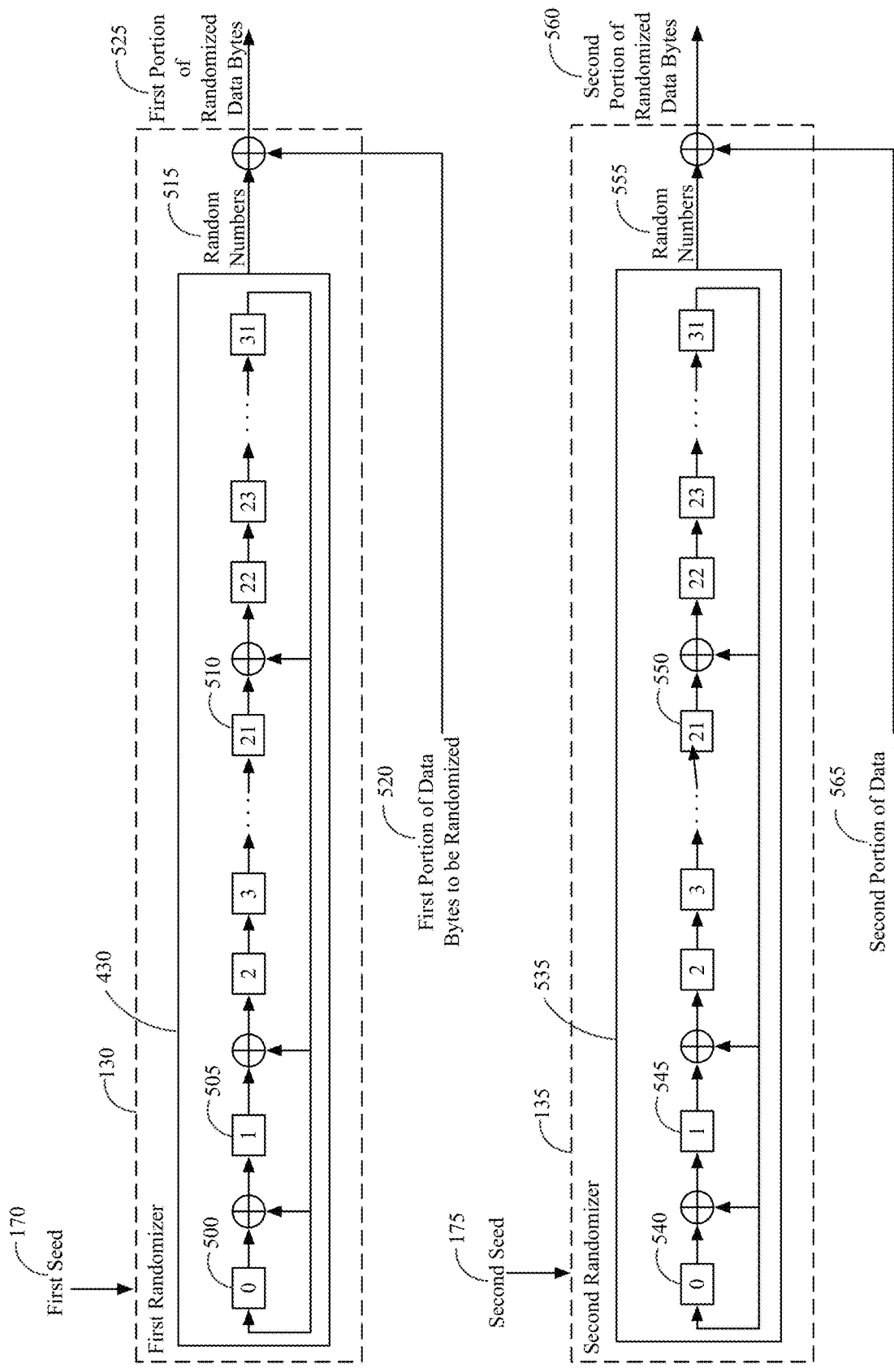
FIG. 5 is diagram illustrating the operation of the linear feedback shift registers of the randomizers, in accordance with an embodiment of the present invention.

With reference to FIG. 5, in a specific embodiment, a first randomizer 130 may operate to randomize a first portion of data bytes to be randomized 520 and a second randomizer 135 may operate, simultaneously, to randomize a second portion of data bytes to be randomized 565. In a particular embodiment, the first portion of data bytes to be randomized 520 may include the odd-number n-byte words in the sector and the second portion of data bytes to be randomized 565 may include the even-number n-byte words in the sector, wherein a word comprises a sequence of bytes. In a specific embodiment, wherein a page of data comprises 1024 bytes, the page may be divided into 16 sectors, and the two randomizers may be operated in parallel to process 2*4 bytes in every clock cycle such that bytes (n*8, n*8+1, n*8+2, n*8+3) are randomized by the first randomizer 130 and bytes (n*8+4, n*8+5, n*8+6, n*8+7) are randomized by the second randomizer 135. As previously described the size of the page of data is device dependent and as such, for a fixed size of 1024 bytes for the data and the ECC per sector, the number of data sectors in each page increases based upon the page size of the specific memory device.

As shown with reference to FIG. 5, at the beginning of each sector of data to be randomized, the first randomizer 130 is initiated with a first seed 170 and the second randomizer is initiated with a second seed 175. A new first seed 170 and second seed 175 are provided by the seed generator 140 at the beginning of each sector of data to be randomized. The first seed 170 is received at a linear feedback shift register (LFSR) 530 of the first randomizer 130 and the second seed 175 is received at a linear feedback shift register (LFSR) 535 of the second randomizer 135. Linear feedback shift registers are well known in the art as a category of shift registers which utilize feedback to modify the output of the register on each rising edge of the clock. The feedback causes the value in the shift register to cycle through a set of unique values. The implementation and feedback of the LFSR is dependent upon the length, gate type, LFSR type, maximum length logic and tap positions, which controls the sequence of repeating values the LFSR iterates through. In a specific embodiment, each of the linear feedback shift registers 530, 535 are defined by a primitive 32-degree polynomial that describes the taps and the initial sequence of bits that initializes each of LFSRs is provided by the seed generator 140. While the LFSR has a finite number of possible states, and as such, eventually repeats, a well selected feedback function defining the taps, and initial seed, can produce a sequence of bit that appears random and has a very long cycle.

Figure 6:
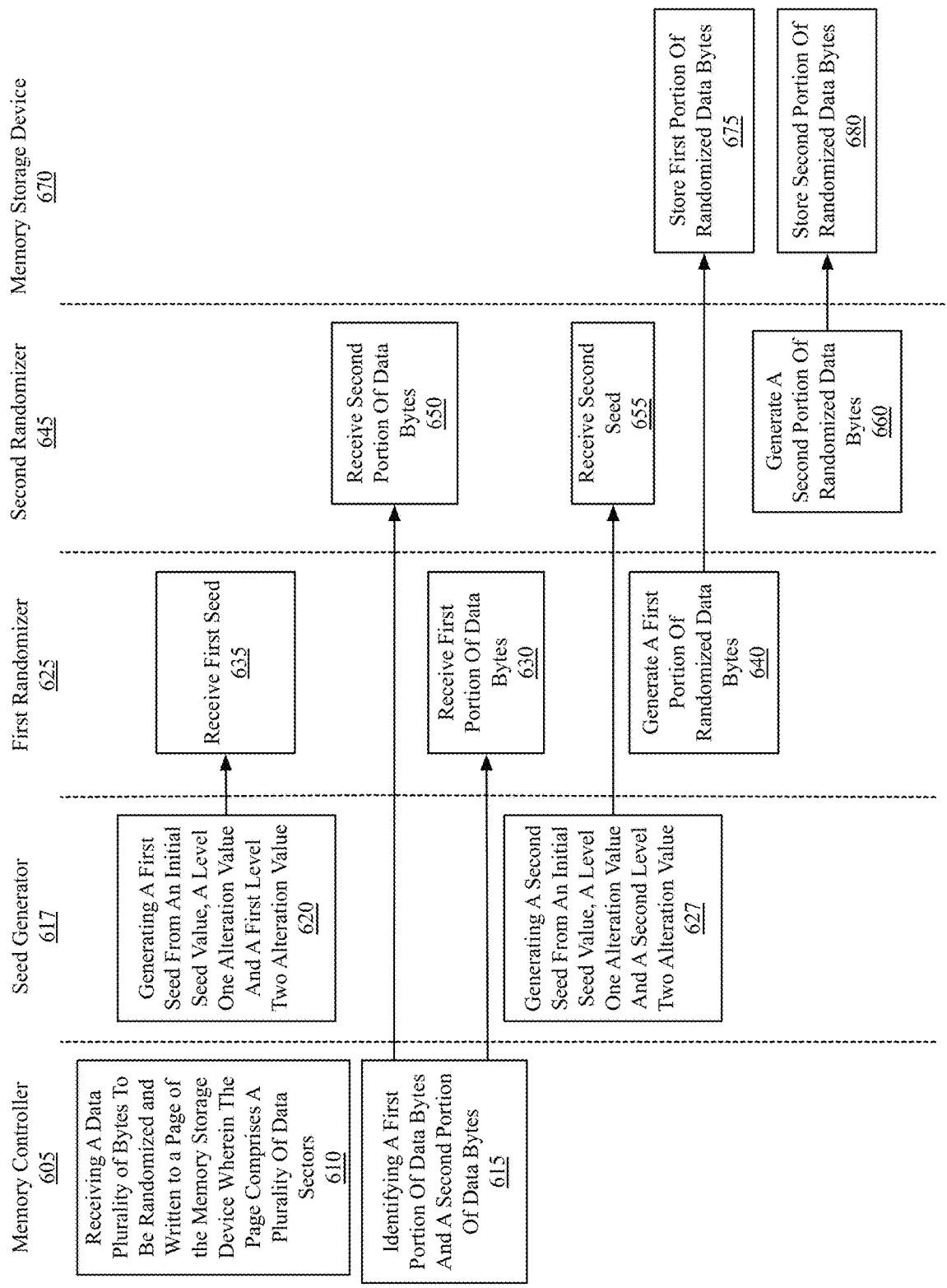
FIG. 6 is a swim diagram illustrating a method for randomizing data, in accordance with an embodiment of the present invention.

In operation, at the beginning of the sector of data to be randomized, the LFSR 530 of the first randomizer 130 receives a first seed 170 from the seed generator 140 and a first portion of data bytes to be randomized 520. The first seed 170 provides the initial sequence of bits that initializes the LFSR 530 of the first randomizer 130. An exclusive-OR operation involving the taps 500, 505, 510 defining the function of the LFSR 530, the feedback and the initial sequence of bits, results in a sequence of random numbers 515 at the output of the LFSR 530. Performing an exclusive-OR between the random number 515 and the first portion of data bytes to be randomized 520 results in a first portion of randomized data bytes 525 at an output of the first randomizer 130. In parallel with the operation of the first randomizer 130, the LFSR 535 of the second randomizer 135 receives a first seed 175 from the seed generator 140 and a second portion of data bytes to be randomized 565. The second seed 175 provides the initial sequence of bits that initializes the LFSR 535 of the second randomizer 135. An exclusive-OR operation involving the taps 540, 545, 550 defining the function of the LFSR 535, the feedback and the initial sequence of bits, results in a sequence of random numbers 555 at the output of the LFSR 535. Performing an exclusive-OR between the random number 555 and the second portion of data bytes to be randomized 565 results in a second portion of randomized data bytes 560 at an output of the second randomizer 135. The first portion of randomized data bytes 525 and the second portion of randomized data bytes 560 are then provided to the memory storage device for FIG. 6 is a swim-diagram of an exemplary process 600 for generating random data. For example, the process 600 can be used by a user and implemented by a memory controller 605, to randomize data to be stored in a memory storage device 670 coupled to the memory controller 605. FIG. 6 illustrates lanes for steps that can be performed by the memory controller 505, a seed generator 617, a first randomizer 625, a second randomizer 645 and the memory storage device 670.

To generate random data at the memory controller 605, a plurality of data bytes to be randomized and written to a page of the memory storage device 670, is received at the memory controller 605 (610), wherein the page comprises a plurality of data sectors and wherein each of the plurality of data sectors are configured to store a plurality of data bytes. In a particular embodiment, a page may store 16K bytes and the page may be divided into 16 sectors of 1024 bytes each.

After the plurality of data bytes is received at the memory controller 605, the memory controller identifies a first portion of data bytes to be operated on by the first randomizer 625 and a second portion of data bytes to be operated on by the second randomizer 645 (615). In a particular embodiment, the first randomizer 625 and the second randomizer 645 may operate in parallel. In a particular embodiment, the first portion of data bytes to be randomized may include the odd-number n-byte words of each sector and the second portion of data bytes to be randomized may include the even-number n-byte words of each sector, wherein a word comprises a sequence of bytes.

The seed generator 617 of the memory controller 605 generates a first seed from an initial seed value, a level one alteration value and a first level two alteration value (620) and a second seed from the initial seed value, the level one alteration value and a second level two alteration value (627).

The first seed and the first portion of data bytes to be randomized are provided to the first randomizer 625 and the second seed and the second portion of data bytes to be randomized are provided to the second randomizer 645. The first randomizer receives the first portion of data bytes to be randomized (630) and the first seed (635) and operates on the first portion of data bytes to be randomized based upon the first seed, to generate a first portion of randomized data bytes 640. The second randomizer 645 receives the second portion of data bytes to be randomized (650) and the second seed (655) and operates on the second portion of data bytes to be randomized based upon the second seed, in parallel with the first randomizer 625, to generate a second portion of randomized data bytes 660.

The first randomizer 625 then provides the first portion of randomized data bytes to the memory storage device 670 and the second randomizer 645 provides the second portion of randomized data bytes to the memory storage device 670. The memory storage device 670 then operates to store the first portion of randomized data bytes (675) and to store the second portion of randomized data bytes (680) in the memory array of the memory storage device 670.

FIG. 7 is a flow diagram of a method 700 for generating randomized data for storage in a memory storage device.

At operation 705, the method includes receiving, at a memory controller coupled to a memory storage device, a plurality of data bytes to be randomized and written to a page of a memory storage device coupled to the memory controller, wherein the page comprises a plurality of data sectors and wherein each of the plurality of data sectors are configured to store a plurality of data bytes. With reference to FIG. 1, in the present invention, the memory controller 105 is configured for receiving the plurality of data bytes to be randomized.

At operation 710, the method includes, randomizing a first portion of the plurality of data bytes using a first randomizer initialized by a first seed to generate a first portion of randomized data bytes to be stored in a first data sector of the plurality of data sectors. With reference to FIG. 1, in the present invention, the first randomizer 130 is configured to generate a first portion of randomized data bytes.

At operation 715, the method includes, randomizing a second portion of the plurality of data bytes using a second randomizer initialized by a second seed to generate a second portion of randomized data bytes to be stored in the data sector of the plurality of data sectors, wherein the first seed is uncorrelated with the second seed. With reference to FIG. 1, in the present invention, the second randomizer 135 is configured to generate a second portion of randomized data bytes.

In various embodiments, the present invention provides a system and method for providing randomized data using uncorrelated seeds to initialize two or more randomizers. The present invention overcomes the deficiencies known in the art methods which require the storage of a large number of unique randomization seeds.

In one embodiment, portions of the memory controller and memory storage device may be implemented in an integrated circuit as a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What we claim is:

1. A method for randomizing data in a memory storage device, the method comprising:

receiving, at a memory controller, a plurality of data bytes to be randomized and written to a page of a memory storage device coupled to the memory controller, wherein the page comprises a plurality of data sectors and wherein each of the plurality of data sectors are configured to store a plurality of data bytes;

selecting an initial seed value from an initial seed table based upon an initial seed index;

selecting a level one alteration value from a level one alteration value table based upon a level one alteration index;

performing an operation between the initial seed value and the level one alteration value to generate a level one altered seed value;

selecting a first level two alteration value from a first level two alteration value table based upon a level two alteration select signal and a level two inverse alteration select signal;

performing an operation between the level one altered seed value and the first level two alteration value to generate a first seed;

selecting a second level two alteration value from a second level two alteration value table based upon the level two alteration select signal;

performing an operation between the level one altered seed value and the second level two alteration value to generate a second seed;

randomizing a first portion of the plurality of data bytes using a first randomizer initialized by the first seed to generate a first portion of randomized data bytes to be written to a data sector of the plurality of data sectors;

randomizing a second portion of the plurality of data bytes using a second randomizer initialized by the second seed to generate a second portion of randomized data bytes to be written to the data sector of the plurality of data sectors, wherein the first seed is uncorrelated with the second seed.

2. The method of claim 1, wherein each of the plurality of data sectors of the page of the memory storage device represents the smallest addressable unit of data that can be written to the memory storage device.

3. The method of claim 1, wherein the first portion of the plurality of data bytes comprises a plurality of odd-number n-byte words of a sector.

4. The method of claim 1, wherein the second portion of the plurality of data bytes comprises a plurality of even-number n-byte words of a sector.

5. The method of claim 1, wherein the first randomizer comprises a first linear-feedback shift register (LFSR) and wherein said randomizing the first portion of the plurality of data bytes further comprises:
providing the first seed to the first LFSR;
generating, by the first LFSR, a random number based upon the first seed; and
performing an exclusive-OR operation with the random number generated by the first LFSR and the first portion of the plurality of data bytes to generate the first portion of randomized data bytes.

6. The method of claim 5, wherein the second randomizer comprises a second LFSR and wherein said randomizing the second portion of the plurality of data bytes further comprises:
providing the second seed to the second LFSR;
generating, by the second LFSR, a random number based upon the second seed; and
performing an exclusive-OR operation with the random number generated by the second LFSR and the second portion of the plurality of data bytes to generate the second portion of randomized data bytes.

7. The method of claim 1, wherein said randomizing of the first portion of the plurality of data bytes and said randomizing of the second portion of the plurality of data bytes are performed substantially simultaneously.

8. The method of claim 1,
wherein the performing the operation between the initial seed value and the level one alteration value comprises performing an exclusive-OR operation between the initial seed value and the level one alteration value to generate the level one altered seed value,
wherein the performing the operation between the level one altered seed value and the first level two alteration value comprises performing an exclusive-OR operation between the level one altered seed value and the first level two alteration value to generate the first seed, and
wherein the performing the operation between the level one altered seed value and the second level two alteration value comprises-performing an exclusive-OR operation between the level one altered seed value and the second level two alteration value to generate the second seed.

9. The method of claim 1, wherein the initial seed index is a function of at least a truncated physical address of the data sector of the page of data to be randomized, a first portion of a write/erase cycle count of the memory storage device and a firmware configurable modulus operation.

10. The method of claim 9, wherein the first portion of a write/erase cycle count of the memory storage device is equal to a first number of least significant bits (LSB) of the write/erase cycle count and wherein the number of least significant bits is firmware configurable.

11. The method of claim 1, wherein the level one alteration index is a function of at least a second portion of a write/erase cycle count of the memory storage device and selected bits of a row address of the page.

12. The method of claim 11, wherein the second portion of a write/erase cycle count of the memory storage device is equal to a first number of most significant bits (MSB) of the write/erase cycle count and wherein the number of most significant bits is firmware configurable.

13. The method of claim 1, wherein the level two alteration select signal is a function of at least selected bits of a row address of the page.

14. A system for randomizing data in a memory storage device, the system comprising:
a memory controller implemented at least partially in hardware, the memory controller further comprising:
interface logic for receiving a plurality of data bytes to be randomized and written to a page of a memory storage device coupled to the memory controller, wherein the page comprises a plurality of data sectors and wherein each of the plurality of data sectors are configured to store a plurality of data bytes;
a seed generator arranged to:
select an initial seed value from an initial seed table based upon an initial seed index;
select a level one alteration value from a level one alteration value table based upon a level one alteration index;
perform an operation between the initial seed value and the level one alteration value to generate a level one altered seed value;
select a first level two alteration value from a first level two alteration value table based upon a level two alteration select signal;
perform an operation between the level one altered seed value and the first level two alteration value to generate a first seed;
select a second level two alteration value from a second level two alteration value table based upon the level two alteration select signal; and perform an operation between the level one altered seed value and the second level two alteration value to generate a second seed;

a first randomizer arranged to randomize a first portion of the plurality of data bytes to generate a first portion of randomized data bytes to be written to a data sector of the plurality of data sectors, wherein the first randomizer is initialized by the first seed; and a second randomizer arranged to randomize a second portion of the plurality of data bytes to generate a second portion of randomized data bytes to be written to the data sector of the plurality of data sectors, wherein the second randomizer is initialized by the second seed, and wherein the first seed is uncorrelated with the second seed.

15. The system of claim 14, wherein each of the plurality of data sectors of the page of the memory storage device represents the smallest addressable unit of data that can be written to the memory storage device.

16. The system of claim 14, wherein the first portion of the plurality of data bytes comprises a plurality of odd-number n-byte words of a sector.

17. The system of claim 14, wherein the second portion of the plurality of data bytes comprises a plurality of even-number n-byte words of a sector.

18. The system of claim 14, wherein the first randomizer for randomizing a first portion of the plurality of data bytes and the second randomizer for randomizing a second portion of the plurality of data bytes are arranged to operate substantially simultaneously.

19. The system of claim 14, wherein the first randomizer comprises a first linear-feedback shift register (LFSR), said first randomizer arranged to:

provide the first seed to the first LFSR;

generate, by the first LFSR, a random number based upon the first seed; and perform an exclusive-OR operation with the random number generated by the first LFSR and the first portion of the plurality of data bytes to thereby generate the first portion of randomized data bytes.

20. The system of claim 19, wherein the second randomizer comprises a second LFSR said second randomizer arranged to:

provide the second seed to the second LFSR;

generate, by the second LFSR, a random number based upon the second seed; and perform an exclusive-OR operation with the random number generated by the second LFSR and the second portion of the plurality of data bytes to thereby generate the second portion of randomized data bytes.

21. The system of claim 14, wherein the performing the operation between the initial seed value and the level one alteration value comprises performing an exclusive-OR operation between the initial seed value and the level one alteration value to generate the level one altered seed value;

wherein the performing the operation between the level one altered seed value and the first level two alteration value comprises performing an exclusive-OR operation between the level one altered seed value and the first level two alteration value to generate the first seed; and wherein the performing the operation between the level one altered seed value and the second level two alteration value comprises performing an exclusive-OR operation between the level one altered seed value and the second level two alteration value to generate the second seed.

22. The system of claim 14, wherein the initial seed index is a function of at least a truncated physical address of the data sector of the page of data to be randomized, a first portion of a write/erase cycle count of the memory storage device and a firmware configurable modulus operation.

23. The system of claim 14, wherein the level one alteration index is a function of at least a second portion of a write/erase cycle count of the memory storage device and selected bits of a row address of the page.

24. The system of claim 14, wherein the level two alteration select signal is a function of at least selected bits of a row address of the page.

25. A non-transitory computer-readable media having computer-executable instructions for performing a method of randomizing data in a memory storage device, the computing device operating under an operating system, the method including issuing instructions from the software program comprising:

receiving, at a memory controller, a plurality of data bytes to be randomized and written to a page of a memory storage device coupled to the memory controller, wherein the page comprises a plurality of data sectors and wherein each of the plurality of data sectors are configured to store a plurality of data bytes;

selecting an initial seed value from an initial seed table based upon an initial seed index;

selecting a level one alteration value from a level one alteration value table based upon a level one alteration index;

performing an operation between the initial seed value and the level one alteration value to generate a level one altered seed value;

selecting a first level two alteration value from a first level one alteration value table based upon a level one alteration index;

performing an operation between the level one altered seed value and the first level two alteration value to generate a first seed;

selecting a second level two alteration value from a second level one alteration value table based upon the level one alteration index;

performing an operation between the level one altered seed value and the second level two alteration value to generate a second seed;

randomizing a first portion of the plurality of data bytes using a first randomizer initialized by the first seed to generate a first portion of randomized data bytes; and randomizing a second portion of the plurality of data bytes using a second randomizer initialized by the second seed to generate a second portion of randomized data bytes, wherein the first seed is uncorrelated with the second seed.

26. The non-transitory computer-readable media of claim 25, wherein each of the plurality of data sectors of the page of the memory storage device represents the smallest addressable unit of data that can be written to the memory storage device.

27. The non-transitory computer-readable media of claim 25, wherein the first portion of the plurality of data bytes comprises a plurality of odd-number n-byte words of a sector.

28. The non-transitory computer-readable media of claim 25, wherein the second portion of the plurality of data bytes comprises a plurality of even-number n-byte words of a sector.

29. The non-transitory computer-readable media of claim 25, wherein randomizing a first portion of the plurality of data bytes and randomizing a second portion of the plurality of data bytes are performed substantially simultaneously.

30. The non-transitory computer-readable media of claim 25, wherein the first randomizer comprises a first linear-feedback shift register (LFSR) and wherein said randomizing the first portion of the plurality of data bytes further comprises:

providing the first seed to the first LFSR;

generating, by the first LFSR, a random number based upon the first seed; and performing an exclusive-OR operation with the random number generated by the first LFSR and the first portion of the plurality of data bytes to generate the first portion of randomized data bytes.

31. The non-transitory computer-readable media of claim 30, wherein the second randomizer comprises a second LFSR and wherein said randomizing the second portion of the plurality of data bytes further comprises:

providing the second seed to the second LFSR;

generating, by the second LFSR, a random number based upon the second seed; and performing an exclusive-OR operation with the random number generated by the second LFSR and the second portion of the plurality of data bytes to generate the second portion of randomized data bytes.

32. The non-transitory computer-readable media of claim 25, wherein the performing the operation between the initial seed value and the level one alteration value comprises performing an exclusive-OR operation between the initial seed value and the level one alteration value to generate the level one altered seed value;

wherein the performing the operation between the level one altered seed value and the first level two alteration value comprises performing an exclusive-OR operation between the level one altered seed value and the first level two alteration value to generate the first seed; and wherein the performing the operation between the level one altered seed value and the second level two alteration value comprises performing an exclusive-OR operation between the level one altered seed value and the second level two alteration value to generate the second seed.

33. The non-transitory computer-readable media of claim 25, wherein the initial seed index is a function of at least a truncated physical address of the data sector of the page of data to be randomized, a first portion of a write/erase cycle count of the memory storage device and a firmware configurable modulus operation.

34. The non-transitory computer-readable media of claim 25, wherein the level one alteration index is a function of at least a second portion of a write/erase cycle count of the memory storage device.

* * * * *

UNITED STATES PATENT AND TRADEMARK OFFICE
CERTIFICATE OF CORRECTION

PATENT NO. : 10,891,083 B2
APPLICATION NO. : 15/921407
DATED : January 12, 2021
INVENTOR(S) : Alessia Marelli, Rino Micheloni and Sivaraman Nair Unnikrishnan Page 1 of 1

It is certified that error appears in the above-identified patent and that said Letters Patent is hereby corrected as shown below:

In the Specification

Column 15, Line 35 after the word "for" add --subsequent writing of the bytes to the memory array--.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*